July 15, 1969  M. M. MURATA  3,455,028
TRIANGULAR SCALE WITH HINGED INDICIA PLATES
Filed Aug. 30, 1968
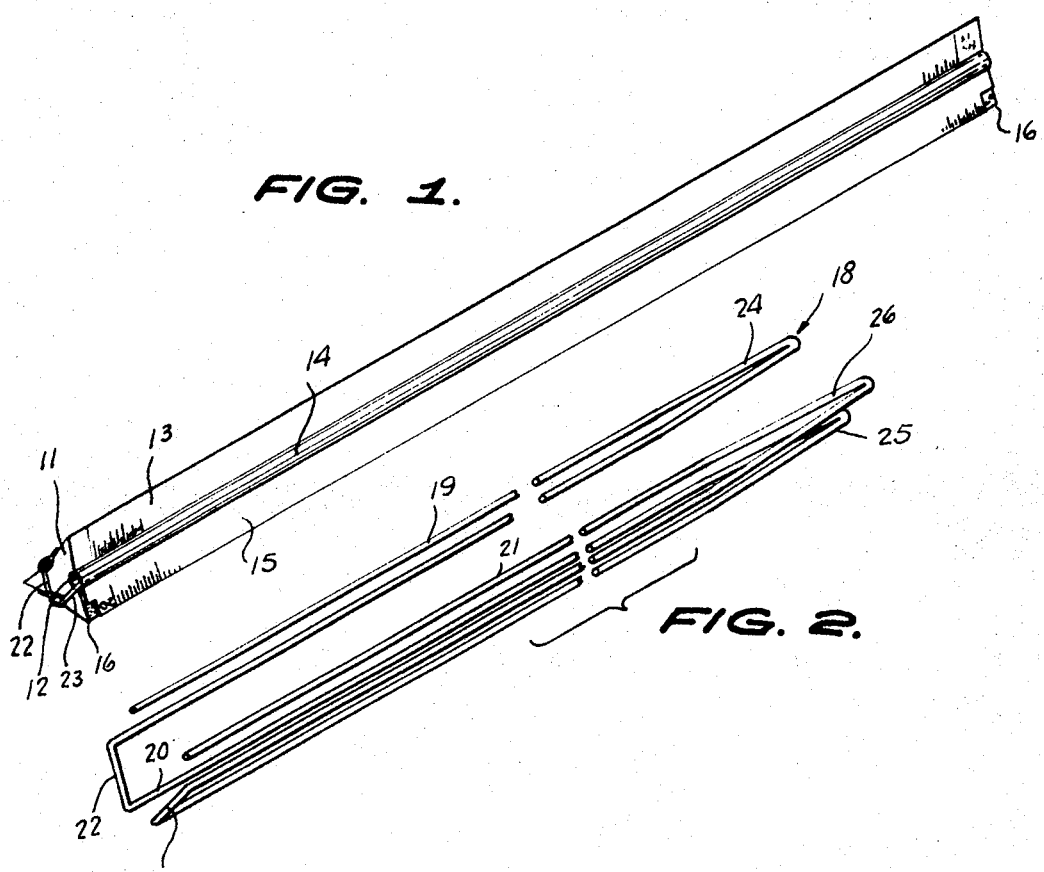
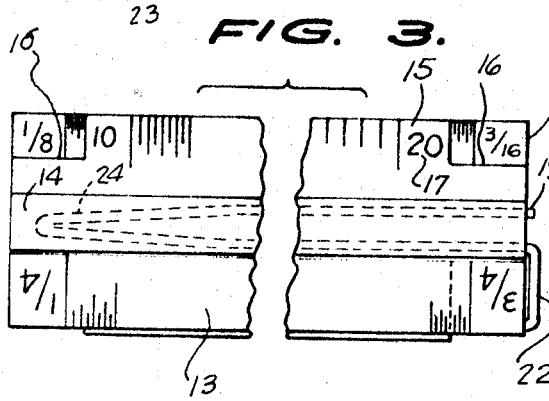
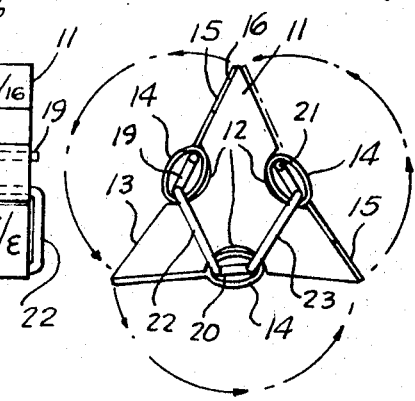
INVENTOR.
MARK M. MURATA,
BY
Berman, Davidson & Berman
ATTORNEYS.

United States Patent Office 3,455,028
Patented July 15, 1969

3,455,028
TRIANGULAR SCALE WITH HINGED INDICIA PLATES
Mark M. Murata, 45-690 Kapunahala Road, Kaneohe, Hawaii 96744
Filed Aug. 30, 1968, Ser. No. 756,490
Int. Cl. B43l 7/00
U.S. Cl. 33—107                                            7 Claims

ABSTRACT OF THE DISCLOSURE

An attachment for a triangular ruler of the type having central longitudinal grooves in its respective calibrated faces. The attachment consists of respective tubular sleeves of oval cross-sectional shape receivable in the grooves, each sleeve having a supplementary longitudinal scale plate rigidly-secured to a longitudinal vertex edge of the sleeve. A one-piece spring wire retainer is employed, the retainer having respective elongated loops engaged in the three sleeves, retaining them in their grooves and yieldably-holding the scale plates flatly against adjacent calibrated face portions of the ruler. The scale plates may be rotated to lie against the opposite calibrated portions of the respective faces.

---

This invention relates to attachments for triangular rulers, and more particularly to an attachment designed to increase the number of available calibrated scales on the ruler.

A main object of the invention is to provide a novel and improved accessory for increasing the number of calibrated scales on a triangular ruler, the accessory being simple in construction, being easy to install, and being very compact in size so that it does not interfere with the use of the triangular ruler.

A further object of the invention is to provide an improved hinged scale accessory adapted for attachment to a standard triangular ruler for the purpose of increasing the number of calibrated scales, the attachment being inexpensive to manufacture, being durable in construction, providing easy substitution of calibrated scales, as desired, and greatly increasing the usefulness of a standard triangular ruler.

A still further object of the invention is to provide an improved accessory for a standard triangular ruler designed to increase the number of available calibrated scales on the ruler, the accessory being neat in appearance, having highly visible scale plate portions, and being provided with self-contained resilient locking means for retaining the scale plate portions in desired operating positions.

Further objects and advantages of the invention will become apparent from the following description and claims, and from the accompanying drawing, wherein:

FIGURE 1 is a perspective view of a standard triangular ruler provided with an improved auxiliary scale plate accessory constructed in accordance with the present invention.

FIGURE 2 is a perspective view of the scale-plate retainer employed with the accessory illustrated in FIGURE 1, drawn to a somewhat larger scale than FIGURE 1.

FIGURE 3 is a fragmentary side elevational view of the triangular ruler of FIGURE 1 with the accessory of the present invention installed thereon, drawn to substantially the same scale as that employed in FIGURE 2.

FIGURE 4 is an end elevational view of the assembly illustrated in FIGURE 3.

Referring to the drawing, 11 generally designates a standard triangular ruler of the type having central longitudinal grooves 12 in its respective faces with respective calibrated scale portions 13 located at opposite sides of the groove of each face and extending longitudinally of the ruler. As is well-known to those skilled in the art, the standard triangular ruler therefore provides a total of six different calibrated scale portions, two scale portions being located on each face of the ruler. Also, as is well-known to those skilled in the art, in many designs of standard triangular rulers, the pairs of calibrated scale portions of the respective faces slope slightly inwardly toward the adjacent central groove 12 so that the faces are generally concave rather than strictly planar.

In accordance with the present invention, an attachment is provided to add multiple calibrated scales which may be of any desired type, to provide additional scales other than those already present on the existing triangular ruler with which the attachment is to be employed. For example, the attachment may provide scales in the metric system for a triangular ruler whose existing scales have graduations based on feet and inches. On the other hand, the attachment may provide auxiliary scales whose calibrations are made in accordance with multiplication factors different from those already present on the existing scales of the triangular ruler with which the attachment is to be employed.

The attachment comprises respective tubular sleeves 14 of oval cross-section adapted to be nestingly and rotatably-received in the respective central longitudinal grooves 12, each sleeve 14 having a scale plate 15 rigidly-secured to a longitudinal vertex edge of the sleeve, as is clearly shown in FIGURE 4, the scale plate being adapted to overlie an adjacent calibrated surface portion 13 of the triangular ruler. Thus, each scale plate 15 is substantially coextensive in length and width with a calibrated face portion 13, except for the provision of respective rectangular notches 16, 16 at the opposite ends of the scale plate. As shown in FIGURE 3, the notches 16, 16 are located at the outer corners of the associated scale plate 15 and are of sufficient size to expose the identification indicia associated with the subjacent calibrated scales of the standard triangular ruler. Also, each of the calibrated scales inscribed on the scale plates is provided with its own identification indicia 17 which is located adjacent to one of the end notches 16, as shown in FIGURE 3.

Designated generally at 18 is a one-piece spring wire retainer which is formed with three elongated retaining loops, shown respectively at 19, 20 and 21, the one-piece wire body being bent so that the retaining loops 19, 20 and 21 are disposed in respective longitudinal planes at 60° angles to each ohter and are connected by respective straight bight portions 22 and 23 at one end of the spring wire retainer 18. The loops are formed at the opposite end of the retainer with convergent end portions, shown respectively at 24, 25 and 26 in FIGURE 2. The loops 19, 20 and 21 extend parallel to each other and are oriented so that they can be simultaneously inserted in respective sleeve portions 14 seated in the grooves 12 of a standard triangular ruler. Thus, with the loops thus inserted in the manner illustrated in FIGURE 1, the straight bight portions 22 and 23 traverse the portions of the end face of the ruler between adjacent grooves 12, as is clearly shown in FIGURE 4.

The sleeves 14 are substantially coextensive in length with the grooves 12, and the loops 19, 20 and 21 are correspondingly substantially coextensive in length with the sleeves. As shown in FIGURE 4, the respective parallel pairs of arms of the loops engage in opposite vertex end portions of the sleeves and act to bias the sleeves toward positions wherein their associated scale plates 15 are retained flatly in overlying relationship to one of the adjacent calibrated surface portions 13 of the ruler. This exposes one of the calibrated scales of each of the auxiliary scale plates 15. Since the scale plates have calibrated scales on both of their sides, to expose the other auxiliary scale of the scale plates, they are rotated to reversed positions. Rotating of the scale plates causes their associated oval sleeves 14 to compress the retaining loops of spring wire contained therein, the flexure of the loops being facilitated by the provision of the relatively long convergent end loop portions 24, 25 and 26. As the rotational movement of the scale plates 15 approaches completion, namely, approaches substantially 180° of rotation, the loops expand and lockingly reengage in opposite vertex portions of the oval cross-sectional contour of the sleeves 14. This yieldably-retains the scale plates in their new positions.

As will be readily apparent, the scale plates can be readily flipped over to expose either desired side thereof. This makes available six additional new calibrated scales, in addition to the original six calibrated scales provided on the associated triangular ruler 11.

When the retainer 18 is inserted, the loops 19, 20 and 21 are placed under tension, sufficient to hold their associated scale plates flatly against adjacent surface portions 13 of the triangular ruler 11. Whenever the scale plates are rotated to their alternate positions, the arms of their associated wire loops are forced together as the oval sleeve portions 14 rotate with respect to the loops. The spacing between the arms of the loops is minimum when the associated scale plates are in their half-way rotated positions. As the scale plates pass their half-way (dead-center) positions, the spring tension of the wire loops causes the arms to return to their original separation, namely, to positions engaging the inside surfaces of the vertex portions of the associated sleeves 14.

The scale plates 15 and associated sleeves 14 may be fabricated from any suitable material, such as metal, plastic, or the like, and may be fabricated in any suitable manner, for example, by extrusion, casting, molding, or the like. The one-piece retainer 18 is preferably formed of suitable high carbon-tempered spring wire. The tapered end portions 24, 25 and 26 of the wire loops preferably are at least one-inch in length.

While a specific embodiment of an improved auxiliary scale attachment for a standard triangular ruler has been described in the foregoing description, it will be understood that various modifications within the spirit of the invention may occur to those skilled in the art.

What is claimed is:

1. An auxiliary scale attachment for a standard triangular ruler of the type having central longitudinal grooves in its respective calibrated faces comprising respective sleeves receivable in the grooves and being substantially coextensive in length with the grooves, an elongated calibrated scale plate substantially coextensive in length with and rigidly-secured to each sleeve, and a one-piece spring wire retainer comprising a single piece of wire formed with three parallel elongated resilient loops engageable in the sleeves and spaced to engage simultaneously in and retain the sleeves in the grooves of a standard triangular ruler.

2. The auxiliary scale attachment of claim 1, and wherein the sleeves are substantially oval in cross-sectional shape and each scale plate is secured to a vertex portion of its associated sleeve.

3. The auxiliary scale attachment of claim 2, and wherein each loop has a generally V-shaped convergent bight portion.

4. The auxiliary scale attachment of claim 3, and wherein each V-shaped convergent bight portion is at least one-inch in length.

5. The auxiliary scale attachment of claim 4, and wherein each scale plate is provided with notches at its outer corners of sufficient size to expose scale identification indicia of a subjacent calibrated scale of the standard triangular ruler.

6. The auxiliary scale attachment of claim 5, and wherein the resilient loops are in planes spaced approximately 60° with respect to each other.

7. The auxiliary scale attachment of claim 6, and wherein the loops are connected opposite their convergent ends by straight wire portions lying in a plane transverse to the loops.

References Cited

UNITED STATES PATENTS

| | | | |
|---|---|---|---|
| 1,091,461 | 3/1914 | Russo | 33—107 |
| 2,124,550 | 7/1938 | Evans | 33—111 |

HARRY N. HAROIAN, Primary Examiner